United States Patent [19]
Sieloff

[11] Patent Number: 5,103,336
[45] Date of Patent: Apr. 7, 1992

[54] MULTILAYERED SECURITY WINDOW STRUCTURE

[75] Inventor: Ronald F. Sieloff, Evansville, Ind.

[73] Assignee: General Electric Company, Pittsfield, Mass.

[21] Appl. No.: 412,044

[22] Filed: Sep. 25, 1989

[51] Int. Cl.⁵ .................. G02F 1/13; G02F 1/137; G02F 1/03; F21V 9/06

[52] U.S. Cl. .................................. 359/253; 359/96; 359/93; 359/361

[58] Field of Search ............... 350/356, 331 R, 347 E, 350/349, 374

[56] References Cited

U.S. PATENT DOCUMENTS

| | | | |
|---|---|---|---|
| 3,853,392 | 12/1974 | Fergason | 350/160 |
| 3,979,548 | 9/1976 | Schafer et al. | 428/425 |
| 4,027,072 | 5/1977 | Molari, Jr. | 428/412 |
| 4,322,476 | 3/1982 | Molari, Jr. | 428/412 |
| 4,328,277 | 5/1982 | Molari, Jr. | 428/215 |
| 4,337,130 | 6/1982 | Ahramjian | 525/28 |
| 4,556,289 | 12/1985 | Fergason | 350/350 |
| 4,591,233 | 5/1986 | Fergason | 350/334 |
| 4,606,611 | 8/1986 | Fergason | 350/334 |
| 4,675,237 | 6/1987 | Bravet et al. | 428/425.6 |
| 4,688,900 | 8/1987 | Doane et al. | 350/347 |
| 4,699,470 | 10/1987 | McLaughlin et al. | 350/334 |
| 4,705,721 | 11/1987 | Frisch et al. | 428/349 |
| 4,743,650 | 5/1988 | Boutni | 525/92 |
| 4,810,063 | 3/1989 | Fergason | 350/347 |
| 4,963,206 | 10/1990 | Shacklette et al. | 350/331 R |

OTHER PUBLICATIONS

Linda Barbee, "Chameleon Glass", *Glass Magazine*, Nov. 1988, pp. 76-77.

*Primary Examiner*—Eugene R. Laroche
*Assistant Examiner*—Evelyn A. Lester
*Attorney, Agent, or Firm*—Hedman, Gibson & Costigan

[57] ABSTRACT

A multilayered security window structure employs an electrically operated optical shutter disposed between protective outer polycarbonate layers. The outer polycarbonate layers protect the optical shutter from impact and from ultraviolet radiation degradation. The structure is useful as a security window in prisons and may be electrically operated to control the transmission of light therethrough.

23 Claims, 1 Drawing Sheet

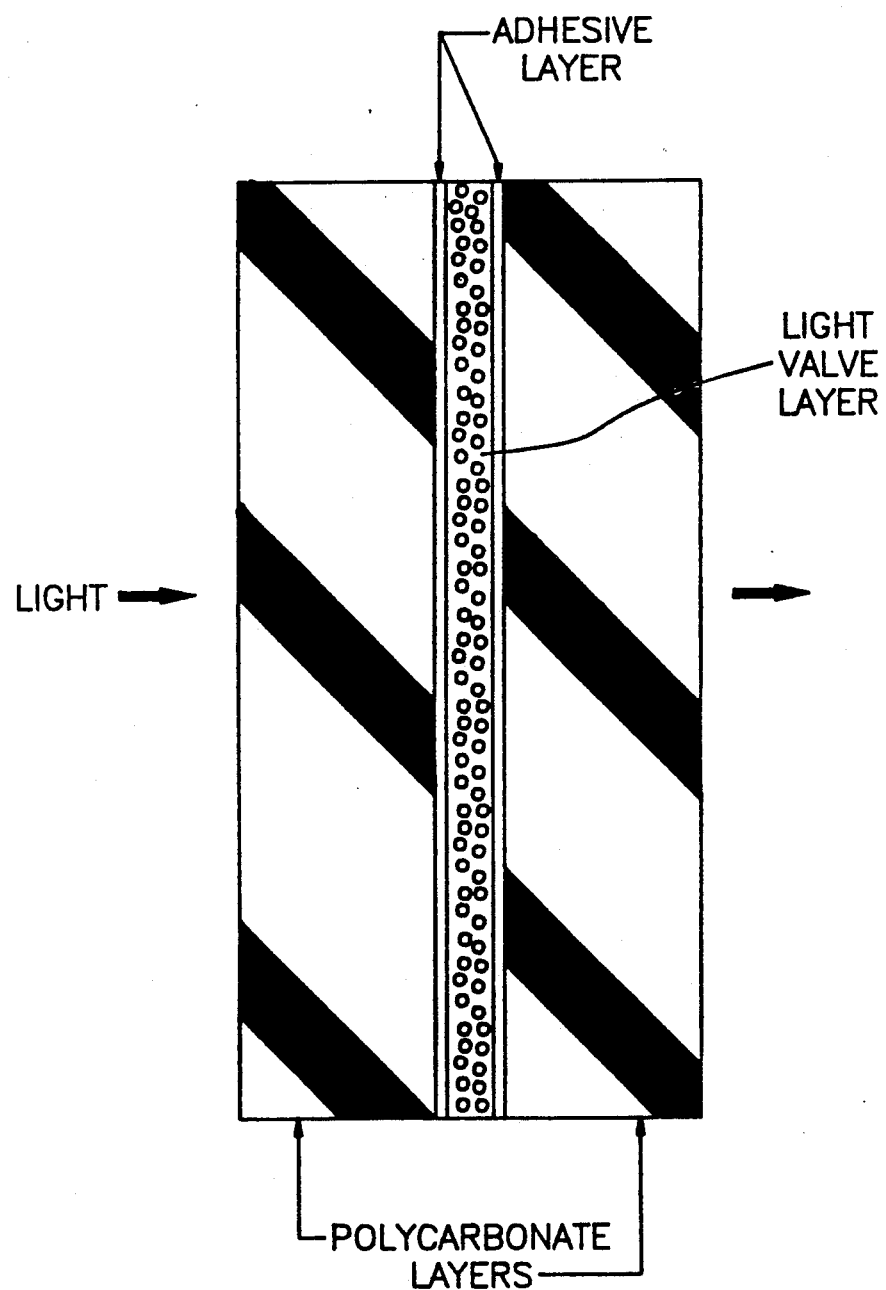

MULTILAYERED SECURITY WINDOW STRUCTURE

BACKGROUND OF THE INVENTION

1. Field of the Invention

The present invention relates to security windows, and more particularly relates to security windows having electrically operated shutters therein.

2. Description of Related Art

Multilayered security structures are known. See, for example, Molari, Jr., U.S. Pat. No. 4,027,072, which discloses laminates of glass and polycarbonate block copolymers. While such laminates are suitable for use in security applications and exhibit good energy absorption, clarity, strength, integrity and penetration resistance, these prior laminates do not, in and of themselves, provide security officers with the option of electrically controlling the viewability therethrough.

Electrically controlled optical shutters are known. See, for example, Ferguson, U.S. Pat. No. 4,556,289, which discloses an optical shutter and discloses employing a polycarbonate support medium. Electrically controlled optical shutters have applications in visual displays, such as billboards, or for controlling the passage of light from one area to another.

Laminates of light valves are known. Presently, laminates of light valve film and glass are available, but the resulting laminates are fragile and are generally unsuitable for exterior use, since the light valve film is subject to ultraviolet degradation.

An object of the present invention is to laminate a light valve film with a thick polycarbonate sheet, thus resulting in a less fragile laminate than those commercially available.

Another object of the present invention is to provide an impact resistant laminate of a light valve film and a UV stabilized polycarbonate sheet that would reduce the ultraviolet radiation degradation of the light valve film. In addition, an object of the present invention is to provide a suitable adhesive layer for the polycarbonate sheet and the light valve film.

A further object of the present invention is to provide a security window which will allow prison staff to quickly and effectively control viewability through the window.

SUMMARY OF THE INVENTION

The present invention relates to impact resistant laminate suitable for security applications. The laminate has a polycarbonate layer of sufficient thickness to be impact resistant and a light valve layer which acts as an electrically controlled shutter. Preferably, the polycarbonate layer is UV stabilized to protect the light valve material from ultraviolet radiation degradation thereby making the laminate suitable for use in outdoor and exterior applications where it will be exposed to sunlight.

BRIEF DESCRIPTION OF THE DRAWINGS

In the drawing is shown a cross-sectional representation of a multilayered security window structure in accordance with the invention where the light valve layer is between the outer polycarbonate layers.

DETAILED DESCRIPTION OF THE INVENTION

The present invention relates to laminates comprising a polycarbonate layer, a suitable adhesive layer and an electrically controlled optical shutter layer. The adhesive layer must be suitable for adhering the electrically controlled optical shutter layer to the polycarbonate sheet.

The electrically controlled optical shutter layer, also referred to as the light valve layer, may be in the form of liquid crystal materials in a film or other suitable medium. The liquid crystal material is characteristic for containing molecules that can be manipulated by the application of a voltage. The liquid crystal material may be sealed between two thin plastic plates, or encapsulated or contained within open or connected micropores of a suitable material. Examples of suitable liquid crystal materials include those disclosed in U.S. Pat. Nos. 4,688,900; 4,606,611; 4,556,289; and 4,591,233; which are incorporated herein by reference.

The configuration of the liquid crystal material layer for the present invention is preferably constructed with a liquid crystal material emulsion sublayer sandwiched between two thin transparent parallel plates coated with a transparent conducting material. The parallel plates are preferably made of polyethylene-terephthalate and are connected to an electrical or voltage source. Suitable plate materials and transparent conducting materials are set forth in one or more of the above patents. An electrical connection between the electrical source and a switch permits the shutter to be controlled by the switch. Upon application of voltage from the electrical source, an electrical potential is created between the two parallel plates allowing polarized light to pass through the liquid crystal material. The amount of polarized light permitted to pass through the light valve material causes the light valve material to switch between an opaque state and a transparent state.

Preferably, the emulsion sublayer containing the liquid crystal material is from about 5 mils to about 50 mils thick, more preferably from about 7 mils to about 20 mils thick, and most preferably about 10 mils thick. The plates sealing the liquid crystal material are each preferably from about 5 mils to about 50 mils thick, more preferably from about 7 mils to about 20 mils thick, and most preferably 10 mils thick. Thus the preferred optical shutter layer has a total thickness of 30 mils.

A preferred liquid crystal material layer for the present invention consists of a 10 mil in thickness film covered with liquid crystal droplets and bonded on each side by a 10 mil in thickness poly(ethylene terephthalate) resin.

The adhesive layer for the present invention may be any transparent substance, preferably organic, that has a melting temperature below the softening temperature of the electrically controlled optical light valve material and is capable of bonding the liquid crystal material layer to the polycarbonate layers by surface attachment at this melting temperature. If the melting/adhesion temperature of the adhesive layer is too high, adhesion of the layers will result in adverse effects upon the electrically controlled light valve rendering it inoperable for controlling light transmission through the laminate. Various materials such as polysiloxane-carbonates are generally unsuitable as adhesive layers in the present laminates because their melt temperatures are too high for melt lamination of the light valve layer to the polycarbonate layers and various materials such as polyvinyl butyral resins are generally unsuitable as the adhesive layers when the light valve layer has an exterior surface of polyethyleneterephthalate because of poor adhesion between the polyvinylbutylate and the polyethyleneterephthalate.

The preferred adhesive layer for the present invention is a polyurethane resin which is produced by the condensation reaction of a polyisocyanate with a hydroxyl-containing material, according to the formula:

$$R_1NCO + R_2OH \rightarrow R_1NHCOOR_2 \qquad (I)$$

wherein $R_1$ and $R_2$ can be the same or different hydrocarbon groups. More preferred polyurethanes are derived from the reaction of polyisocyanoates with linear polyesters or polyethers containing hydroxy groups. Suitable polyurethane adhesives for the present invention include polyisocyanoates, modified polyisocyanoates, prepolymers with terminal isocyanoate groups, soluble polyurethane elastomers, and aqueous polyurethane dispersions.

Any of the organic diisocyanates and polyisocyanates previously employed in the preparation of polyurethanes can be employed in preparing the polyurethane adhesive layer. Illustrative of such isocyanates are: methylenebis(phenyl isocyanate) including the 4,4'-isomer, the 2,4'-isomer and mixtures thereof, m- and p-phenylene diisocyanates, chlorophenylene diisocyanates, a,a'-xylylene diisocyanate, 2,4- and 2,6-toluene diisocyanate and the mixtures of these latter two isomers which are available commercially, tolidine diisocyanate, hexamethylene diisocyanate, and methylenebis(cyclohexyl isocyanate) including the 4,4'-isomer as well as mixtures of the 4,4'-isomer with amounts (up to about 70 percent by weight) of the 2,4'-isomer, and modified forms of this diisocyanate. By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347 which are incorporated herein by reference.

Suitable adhesive layers include a film comprising a polyurethane formed from at least one aliphatic or cycloaliphatic diisocyanoate, at least one polyol chosen from among the polyester diols, the polycaprolactone diols, the polycarbonate diols, and the polybutadiene diols, and at least one chain-lengthening agent which is a product of the reduction of dimeric acid to a diol as disclosed in U.S. Pat. No. 4,705,721. Another suitable adhesive is comprised of an isocyanoate component comprising a monoisocyanate with a double ethylene bond and from a polyol component and at least one polymerization initiator as disclosed in U.S. Pat. No. 4,675,237. The most preferred polyurethane adhesives for the present invention are polyether aliphatic urethanes with a yield factor of about 167 sq. ft/lb./mil, a specific gravity of 1.15, a melting point range between 280° F. to 320° F. and are available from Steven Elastomerics under the commercial name MP-2280.

Each adhesive layer is preferably from about 5 mils to about 30 mils thick, more preferably from about 10 mils to about 20 mils thick, most preferably about 15 mils thick.

Polycarbonates for use in providing the thick polycarbonate layer or layers of the present invention are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.40 to 1.0 dl/g as measured in methylene chloride at 25° C. In one embodiment, the polycarbonates are derived from dihydric phenols and carbonate precursors and generally contain recurring units of the formula:

$$-O-Y-O-\overset{O}{\overset{\|}{C}}- \qquad (II)$$

where Y is a divalent aromatic radical of the dihydric phenol employed in the polycarbonate producing reaction.

Suitable dihydric phenols for producing polycarbonates include the dihydric phenols such as, for example, 2,2-bis(4-hydroxyphenyl)propane; bis(4-hydroxyphenyl)methane; 2,2-bis(4-hydroxy-3-methylphenyl)propane; 4,4-bis(4-hydroxyphenyl)heptane; 2,2-(3,5,3',5'-tetrachloro-4,4'-dihyroxyphenyl)-propane; 2,2-(3,5,3',5'-tetrabromo-4,4'-dihydroxyphenyl)propane; and 3,3'-dichloro-4,4'-dihydroxydiphenyl)methane. Other dihydric phenols which are also suitable for use in the preparation of the above polycarbonates are disclosed in U.S. Pat. Nos. 2,999,835; 3,038,365; 3,334,154; and 4,131,575; incorporated herein by reference.

It is of course possible to employ two or more different dihydric phenols or a copolymer of a dihydric phenol with a glycol or with a hydroxy- or acid-terminated polyester, or with a dibasic acid in the event a carbonate copolymer or interpolymer rather than a homopolymer is desired for use in the preparation of the articles of the invention. Blends of any of the above materials can also be employed to provide the aromatic polycarbonate. In addition, branched polycarbonates such as are described in U.S. Pat. No. 4,001,184 can also be utilized in the practice of this invention, as can blends of a linear polycarbonate and a branched polycarbonate.

The carbonate precursor employed can be either a carbonyl halide, a carbonate ester or a haloformate. The carbonyl halide which can be employed are carbonyl bromide, carbonyl chloride and mixtures thereof. Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)carbonate, etc., di(alkylphenyl)carbonate such as di(tolyl)carbonate, etc., di(napthyl)carbonate, di(chloronapthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described in Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their relative derivatives, such as the acid dihalides, e.g., dichlorides. A quite useful class of aromatic polyestercarbonates are those derived from bisphenol A; terephthalic acid, isophthalic acid or a mixture thereof or their respective acid chlorides; and phosgene. If a mixture of terephthalic acid and isophthalic acid is employed, the weight ratio of terephthalic acid to isophthalic acid may be from about 5:95 to about 95:5. Another polycarbonate which may be used has from about 70 weight percent to about 95 weight percent ester content and a range of terephthalate groups of from 2 weight percent to about 15 weight percent of the total ester content. The remaining ester units are isophthalate units. These polycarbonates are more commonly known as polyphthalate carbonates and are described, for example, by Miller, et. al., U.S. Pat. No. 4,465,820, herein incorporated by reference in its entirety.

The polycarbonates used to form the present invention can be manufactured by known processes, such as, for example, by reacting a dihydric phenol with a carbonate precursor such as diphenyl carbonate or phosgene in accordance with the methods set forth in the above-cited literature and U.S. Pat. Nos. 4,018,750 and 4,123,436, or by transesterification processes such as are disclosed in U.S. Pat. No. 3,153,008 as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octrylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate or an alkali or alkaline earth metal.

The catalyst which can be employed are those that typically aid the polymerization of the monomer with phosgene. Suitable catalysts include tertiary amines such as triethylamine, tripropylamine, N,N-dimethylaniline, quaternary ammonium bromide, cetyl triethyl ammonium bromide, tetra-n-heptyl ammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic, anhydride, pyromellitic acid, pyromellitic dianhydride, mellitic acid, mellitic anhydride, benzophenonetetracarboxylic anhydride, and the like. The preferred polyfunctional aromatic compounds are trimellitic anhydride and trimellitic acid or their acid halide derivatives.

The polycarbonate layer for the present invention is preferably from about 5 mils to about 400 mils thick, more preferably from about 100 mils to 300 mils thick, most preferably about 250 mils thick. The impact resistant laminates preferably have polycarbonate layers of a thickness of at least 25 mils in thickness.

The laminate of the present invention can comprise an optical shutter layer with a layer of polycarbonate on one or both sides of the light valve layer. The polycarbonate layer(s) may be adhered to the light valve layer with suitable adhesive layers, such as a polyurethane adhesive layer. The laminates may be constructed such that the length and width of each layer of the laminate is the same size, thus all of the layers of the laminate would extend to the edges of the laminate.

Another possible configuration for the laminate would involve a layer of liquid crystal material of a smaller length and width than that of the polycarbonate and adhesive layers. This configuration would provide edges of the laminate with only polycarbonate layers and adhesive layers and the inner part of the laminate with polycarbonate layer, adhesive layer, liquid crystal material layer, adhesive layer and polycarbonate layer. Such a configuration would provide direct adhesion between the polycarbonate layers and polyurethane layers around the periphery of the laminate.

The laminate of the present invention is preferably modified to resist ultraviolet radiation degradation. The liquid crystal material may be modified with suitable ultraviolet radiation absorbers, the adhesive layer may be modified with suitable ultraviolet radiation absorbers, a layer containing suitable ultraviolet radiation absorber may be placed on either side of the adhesive layer, the polycarbonate layer may be modified with suitable ultraviolet radiation absorber, or a combination of the modifications may be made to the laminate. Preferably, the polycarbonate layer is UV stabilized.

Ultraviolet radiation absorbers suitable for the present invention include those well known in the art. Examples of such ultraviolet radiation absorbers include coatings containing benzophenones, substituted benzophenones, benzotriazoles and cyanoacrylates such as set forth in U.S. Pat. Nos. 4,556,606; 3,043,709; 3,049,443; 3,309,220; 4,129,667; and 2,976,259; all of which are incorporated herein by reference.

The ultraviolet radiation absorbers can be incorporated into the laminate by any of the methods known in the art. Methods include incorporating the absorber into the melt of the polycarbonate or into the adhesive layer; coating the surface of the polycarbonate with a UV stabilized coating composition, for example, an acrylic coating; surface impregnating the polycarbonate with a UV stabilizer by swelling the substrate, imbedding the absorber into a polycarbonate layer by melting both the absorber and the layer, applying the UV absorber to the polycarbonate layer by using an aqueous solution of absorbers which are more soluble in the polycarbonate layer than in the aqueous solution, or by contacting the polycarbonate layer with an element containing an absorber. Suitable methods for ultraviolet stabilization of resins and laminates are set forth in U.S. Pat. Nos. 4,146,658; 4,322,455; 4,323,597; 4,353,965;

4,396,678; 4,404,257; 4,410,594; 4,556,606 and 4,776,913; which are incorporated herein by reference.

The laminate of the present invention can be modified to be abrasion resistant by coating the outer polycarbonate layer with an abrasion resistant coating material. Various methods known in the art can be used to make the polycarbonate abrasion resistant. Such methods include, but are not limited to, coating the polycarbonate with a primer layer of a thermoplastic or thermoset acrylic polymer, applying a topcoat of an organopolysiloxane which may be silica filled and curing the coating as set forth in U.S. Pat. Nos. 4,228,378; 4,239,798; 4,284,685; 4,188,451; 4,197,335; and 4,615,947. Other suitable abrasion resistant coatings include those containing polythiol and polyenes, polythiol, polyene and silicone modified polyester copolymer; ultraviolet cured coatings containing polyfunctional acrylate monomers and resorcinol monobenzoate; photocurable coatings containing polyfunctional acrylates, acrylonitriles and a photoinitiator; and polycaprolactone polyols or polyester polyols and aminoplast derivatives as set forth in U.S. Pat. Nos. 4,082,891; 4,199,648; 4,198,465; 4,557,955; 4,598,021; and 4,714,657; which are incorporated herein by reference. The UV absorbers of the polycarbonate layer may be incorporated into either the acrylic primer or the organopolysiloxane coating.

What is claimed is:

1. A penetration resistant laminate comprising:
    (i) an outer polycarbonate layer or layers located in the direction of impact, said polycarbonate layer or layers having an overall thickness of from between 25 mils and 400 mils; and
    (ii) an inner light valve material layer.

2. The laminate of claim 1 wherein said polycarbonate layer and said light valve material layer are adhered to each other with an adhesive layer disposed between said polycarbonate layer and said light valve material layer.

3. The laminate of claim 2 wherein said adhesive layer is a polyurethane layer.

4. The laminate of claim 1 wherein said laminate includes an effective amount of an ultraviolet radiation absorber to resist ultraviolet radiation degradation.

5. The composite of claim 1 wherein said light valve material is located between two layers of polycarbonate.

6. The laminate of claim 1 further including an abrasion resistant coating on said outer polycarbonate layer.

7. The laminate of claim 1 wherein said polycarbonate layer or layers have an overall thickness from about 100 mils to about 300 mils.

8. The laminate of claim 1 wherein said polycarbonate layer or layers have an overall thickness of about 250 mils.

9. A penetration resistant laminate comprising:
    a) two outer layers comprising polycarbonate layer or layers, with each outer layer having an overall thickness of from between 25 mils and 400 mils; and
    b) an inner light valve material layer wherein said light valve material layer is located between said outer polycarbonate layers.

10. The laminate of claim 9 wherein said outer polycarbonate layers include an effective amount of an ultraviolet radiation absorber to resist ultraviolet radiation degradation.

11. The laminate of claim 10 wherein said outer polycarbonate layers are adhered to said light valve material layer by adhesive layers.

12. The laminate of claim 11 wherein said adhesive layers are polyurethane adhesive layers.

13. The laminate of claim 11 wherein said polycarbonate layers and adhesive layers are wider and longer than said light valve material layer such that said outer polycarbonate layers and adhesive layers envelope said light valve material layer.

14. The laminate of claim 9 wherein said polycarbonate layers have an overall thickness from about 100 mils to about 300 mils.

15. The laminate of claim 9 wherein said polycarbonate layers each have an overall thickness about 250 mils thick.

16. An electrically controlled penetration resistant security window unit comprising:
    a) a penetration resistant laminate, said penetration resistant laminate having:
        (i) a penetration resistant outer polycarbonate layer or layers having an overall thickness of from between 25 mils and 400 mils;
        (ii) a light valve layer electrically responsive to voltage wherein said light valve layer changes from an opaque state to a transparent state in response to changes in the voltage applied to said light valve layer;
    b) a voltage source;
    c) a switch;
    d) an electrical connection between said light valve layer, switch and voltage source, said switch being operable to apply a voltage to said light valve layer to cause said light valve layer to be switched between said opaque state and said transparent state.

17. The laminate of claim 16 wherein said light valve layer is located between two polycarbonate layers.

18. The window of claim 16 wherein said polycarbonate layer or layers have an overall thickness from about 100 mils to about 300 mils.

19. The window of claim 13 wherein said polycarbonate layer or layers has an overall thickness of about 250 mils.

20. The laminate of claim 16 wherein said light valve layer is adhered to said outer polycarbonate layer or layers by an adhesive layer or layers.

21. The laminate of claim 20 wherein said adhesive layer or layers are polyurethane adhesive layer or layers.

22. The laminate of claim 21 wherein said polycarbonate layer or layers and adhesive layer or layers are wider and longer than said light valve material layer such that said polycarbonate layers and adhesive layers envelope said light valve material layer.

23. A penetration resistant laminate as defined in claim 22 which consists essentially of inner and outer polycarbonate layers of about 100 mils to about 300 mils in thickness; a polyurethane adhesive layer; a light valve layer and a scratch resistant layer on said polycarbonate layers.

* * * * *